(12) United States Patent
Berra et al.

(10) Patent No.: US 6,684,989 B2
(45) Date of Patent: Feb. 3, 2004

(54) SPRING BRAKE CYLINDER HAVING AN EMERGENCY RELEASE DEVICE

(75) Inventors: Philippe Berra, Pau (FR); Hervé Gumez, Lescar (FR)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/258,376

(22) PCT Filed: Oct. 26, 2001

(86) PCT No.: PCT/EP01/12380
§ 371 (c)(1),
(2), (4) Date: Oct. 23, 2002

(87) PCT Pub. No.: WO03/039933
PCT Pub. Date: May 15, 2003

(65) Prior Publication Data
US 2003/0094851 A1 May 22, 2003

(30) Foreign Application Priority Data
Nov. 2, 2000 (DE) .......................................... 100 54 149

(51) Int. Cl.⁷ .............................................. F16D 65/24
(52) U.S. Cl. ........................ 188/170; 188/203; 188/216
(58) Field of Search ............................... 188/166, 167, 188/170, 203, 216, 196 D, 196 P, 71.9

(56) References Cited

U.S. PATENT DOCUMENTS

| | | | | |
|---|---|---|---|---|
| 4,063,491 A | * | 12/1977 | Roger et al. | 92/130 A |
| 4,472,995 A | * | 9/1984 | Persson | 91/189 A |
| 4,478,319 A | * | 10/1984 | Casalone et al. | 188/170 |
| 4,550,811 A | * | 11/1985 | Rumsey | 188/170 |
| 4,865,166 A | * | 9/1989 | Rocholl et al. | 188/196 D |
| 5,154,491 A | * | 10/1992 | Graham | 303/6.01 |
| 5,725,076 A | * | 3/1998 | Pierce et al. | 188/170 |
| 6,435,321 B1 | * | 8/2002 | Asano | 188/170 |

FOREIGN PATENT DOCUMENTS

| | | |
|---|---|---|
| DE | 726 569 | 10/1942 |
| DE | 27 08 624 | 8/1978 |
| DE | 197 55 210 C 1 | 8/1999 |

OTHER PUBLICATIONS

Erich Bollman: *"Die Eintouren–Rollenkupplung—ein vielseitges Schaltelement"*; pp. 101–106, *antriebstechnik 12*, Nr. 4, (1973).

* cited by examiner

*Primary Examiner*—Christopher P. Schwartz
*Assistant Examiner*—Devon Kramer
(74) *Attorney, Agent, or Firm*—Barnes & Thornburg

(57) ABSTRACT

A spring brake cylinder having an emergency release device, particularly for rail vehicles, comprising: a housing; a spring piston for operating and releasing a spring brake; a normally locked, not self-locking threaded screw drive; an outer-radial sliding surface having a detent flank, the outer-radial sliding surface being an element of a rotatable part of the threaded screw drive, and the threaded screw drive having a pitch dimensioned such that the rotatable part carries out less than a complete rotation along its maximal axial adjusting stroke, and the detent flank being configured for locking the emergency release device; and a latch for interacting in a form-locking manner with the detent flank to lock the emergency release device, and for releasing the spring brake in the absence of a release pressure medium and thereby permitting axial movement of the spring piston.

11 Claims, 2 Drawing Sheets

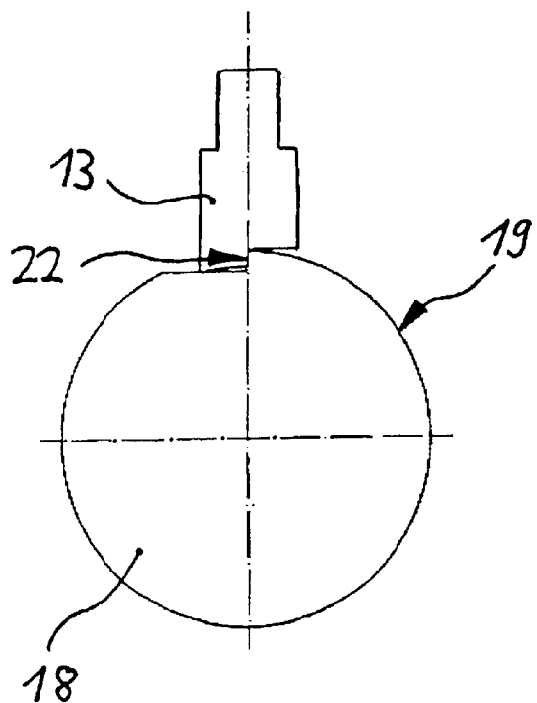
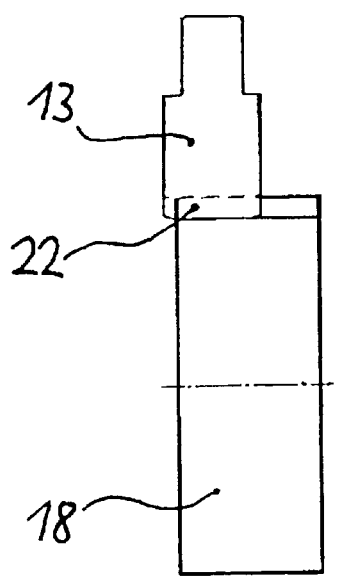
Fig.2a    Fig.2b
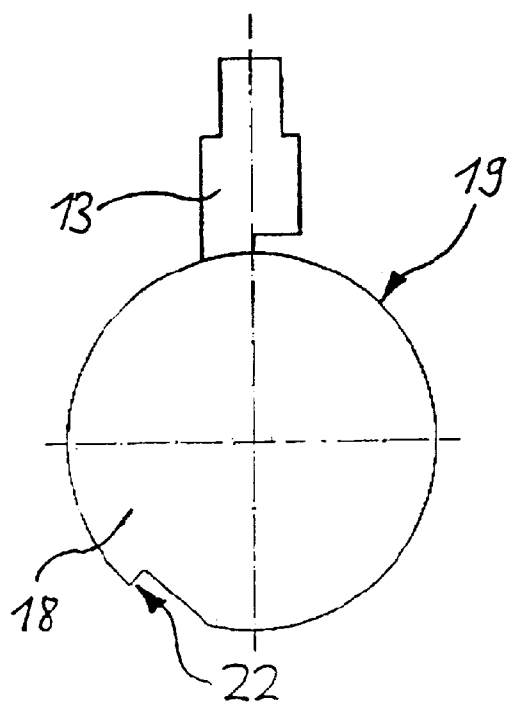
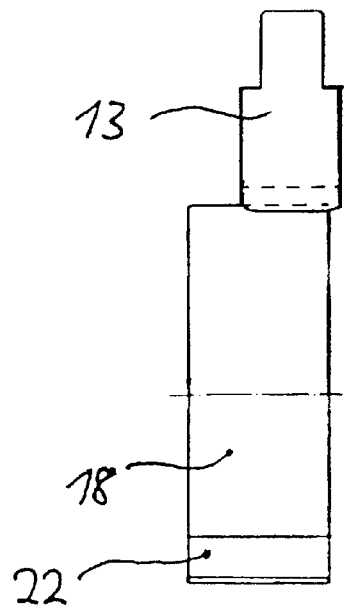
Fig.3a    Fig.3b

SPRING BRAKE CYLINDER HAVING AN EMERGENCY RELEASE DEVICE

BACKGROUND AND SUMMARY OF THE INVENTION

The invention relates to a spring brake cylinder, particularly for rail vehicles, having an emergency release device and having a spring piston which can be moved axially within a housing. On the one hand, the spring bake cylinder can be moved by means of an accumulator-type spring for operating the brake in the event of a pressure drop and, on the other hand, can be moved by a spring pressure chamber. The spring pressure chamber can be acted upon by a pressure medium, for releasing the spring brake, and has a normally locked, not self-locking threaded screw drive which is arranged in a flux or transmission of force between the spring piston and an output-side piston rod. The screw drive can be manually unlocked by way of a latch assigned to the emergency release device, in order to be able to release the spring brake without any pressure medium.

As a safety-relevant subassembly, spring brake cylinders of the above-described type are preferably used in rail vehicle construction for ensuring a brake operation when there is no brake pressure. In the case of a spring brake cylinder, the brake can be operated only by way of accumulator-type springs so that the spring brake cylinder can be used as a parking brake of a rail vehicle in the parked condition and as a safety brake when the compressed-air system is leaking or has failed during the driving operation.

A spring brake cylinder of the above-mentioned type is known from German Patent Document DE-OS 26 08 502. That spring brake cylinder consists essentially of a cylindrical housing with an interior accumulator-type spring which, for the brake operation, in the event of a pressure falling in the pressure chamber, acts upon the piston from the opposite side, so that the output-side piston rod moves out. A releasing of the brake takes place by the admission of pressure medium to the pressure chamber, in which case the accumulator-type spring is tensioned again and the piston rod moves in.

Furthermore, the spring brake cylinder has an emergency release device for the interruption of and the automatic returning into the above-explained normal operating mode of the spring brake cylinder, for the purpose of which a lockable, not self-locking threaded screw drive is arranged in the flux or transmission of force between the piston and the piston rod. The threaded screw drive consists essentially of a part which is rotatable with respect to the housing and of a part which is non-rotatable. The rotatable part may either be a nut which interacts with the piston and which is in a threaded engagement with a screw constructed on the piston rod; or, the rotatable part may be the screw which will then be rotatably disposed with respect to the piston rod, in which case its assigned nut is non-rotatably arranged with respect to the piston. Both carry out the same function.

During the normal braking operation—that is, when pressure is present—, the rotatable part of the threaded spindle drive is locked by way of a latch, so that a rigid flux or transmission of force is established between the piston and the piston rod in order to permit a pressure-medium-operated restoring of the piston while tensioning the accumulator-type spring in the above-described manner. The emergency release device is required for releasing the brake in the event that no pressure is available for the compression of the accumulator-type spring. That is in an instance when the rail vehicle has to be moved—for example, during a switching. In this case, the transmission of force from the piston to the piston rod is manually interrupted from the outside by the unlocking of the not self-locking threaded screw drive by way of the latch, whereby a release of the brakes can take place without any pressure. The return into the original operating condition of the spring brake cylinder takes place automatically when pressure is available again which then, as a result of the compression of the accumulator-type spring, causes a return movement of the parts of the emergency release device.

In the prior art, this function is implemented by way of a detent pawl toothing provided at the outer radius on the rotatable part of the threaded screw drive, which detent pawl toothing meshes with the latch in the manner of a ratchet and pawl. The detent pawl toothing permits a relative rotating movement of the rotatable part of the threaded screw drive in only one direction, whereas the rotation into the other direction is prevented by the detent flanks of the toothing.

Here, the problem arises that, if the latching engages before the stoppage of the rotating parts, particularly, during a brief operation as the result of a slipping off the handle of the latch, the ratchet and pawl may be considerably worn and damaged. At extremely low temperatures, particularly as a result of the then reduced viscosity of the lubricant, the end position in the emergency-released condition may not be reliably reached so that the brake is not or cannot be completely released. This unfavorable condition will then be fixed by a reengagement of the latch. In addition, the forming of the detent pawl toothing at the rotatable part of the threaded screw drive requires fairly high expenditures with respect to the manufacturing.

The present invention relates to a further improvement of a spring brake cylinder of the above-described type such that a reliable functioning of the emergency release device is achieved in a simple manner.

The present invention relates to a spring brake cylinder having an emergency release device, particularly for rail vehicles, comprising: a housing; a spring piston which can be moved axially within the housing by one of at least one accumulator-type spring for operating a spring brake in the event of a release pressure medium drop and a spring pressure chamber for releasing the spring brake when the chamber is acted upon by a release pressure medium; a normally locked, not self-locking threaded screw drive arranged in a flux or transmission of force between the spring piston and an output-side piston rod; an outer-radial sliding surface having a detent flank, the outer-radial sliding surface being an element of a rotatable part of the threaded screw drive that rotates with respect to the housing, and the threaded screw drive having a pitch dimensioned such that the rotatable part carries out less than a complete rotation along its maximal axial adjusting stroke, and the detent flank being configured for locking the emergency release device; and a latch, held in contact with the sliding surface, for interacting in a form-locking manner with the detent flank to lock the emergency release device, and for releasing the spring brake in the absence of the release pressure medium by manually unlocking the not self-locking screw drive and thereby permitting axial movement of the spring piston.

According to the present invention, an avoidance of a plurality of teeth on a ratchet, a wearing of the toothing as a result of an unfavorable engagement situation of the latch during the movement of the rotatable part of the threaded screw drive is avoided. In the event of a brief operation as a result of a slipping off the handle of the latch, the latch always comes to rest on the sliding surface. A skipping of a tooth by the latch, which would cause damage, is made impossible in that the rotatable part of the threaded screw drive can maximally carry out not more than one complete rotation. The engaging position of the latch is therefore precisely defined. This position is exclusively located in an end position of the piston after a restoring of the operability from an emergency-released condition of the spring brake cylinder.

The sliding surface of the part of the threaded screw drive which can be rotated relative to the housing is constructed in the manner of a curved path. In this case, the detent flank constructed on the curved-path-type sliding surface preferably has an essentially radially aligned surface in order to ensure a secure engagement of the latch. The curved-path-type sliding surface has a stroke difference which occurs in an interaction with the latch and that stroke difference can be utilized for indicating a switching condition of the emergency release device. The curved-path-type sliding surface may be provided with additional shaped-on sections or indentations in order to be able to judge from an outside view of different resulting stroke differences, for example, in the emergency-released condition, the degree of release of the brake.

Within the scope of the present invention, the detent flank constructed on the sliding surface can be shaped in a groove-type manner as an indentation or in a tooth-type manner as an elevation or in another shape permitting a detent engagement with the latch.

The emergency release device according to the present invention, when used with spring brake cylinders, may be configured such that a part of the threaded screw drive rotatable relative to the housing is constructed as a screw. The screw may be axially displaceable or displaced together with the piston rod and the screw may be disposed to be rotatable about the piston rod and may interact with a nut of the threaded screw drive. The nut may be a non-rotatable part, and may be stationarily arranged with respect to the spring piston.

As an alternative the part of the threaded screw drive rotatable relative to the housing may be constructed as a nut. The nut may be axially displaceable or displaced together with the spring piston and the nut may be coaxially rotatably disposed on the spring piston, and may interact with a screw of the threaded screw drive. The screw may be a non-rotatable part and may be stationarily arranged with respect to the piston rod.

In the above case of the rotatable screw, a gear wheel element, which has an outer-radial sliding surface with the detent flank, according to the present invention, can be stationarily fastened, at an end side, to the screw as a separate component. On the whole, the manufacturing of the rotatable screw is simplified thereby and a separate exchange of a worn component can take place by demounting.

A spring arranged between the latch and the housing is preferably provided in order to hold, in the manner of a compression or tension spring, the latch in a continuous contact on the sliding surface of the rotatable part of the threaded screw drive. In addition to a manual operation, it is conceivable to operate the latch against the spring force also by means of an auxiliary device in a remote-controllable manner. As the auxiliary device, a switch-controlled electric or pneumatic actuator could be used, in which case the auxiliary energy required for this purpose may optionally be made available by storage in a battery or a pressure reservoir.

Other aspects and novel features of the present invention will become apparent from the following detail description of the invention when considered in conjunction with the accompanying drawings.

BRIEF DESCRIPTION OF THE DRAWINGS

FIG. 2a is a top view of a schematic representation of a form-locking engagement of a latch and gear wheel element in an operative condition, according to the present invention;

FIG. 2b is a lateral view of the engagement, according to FIG. 2a;

FIG. 3a is a top view of a schematic representation of a disengaged form-locking engagement of a latch and gear wheel element in the emergency-released condition, according to the present invention;

FIG. 3b is a lateral view of the disengagement, according to FIG. 3a.

Figure 1:
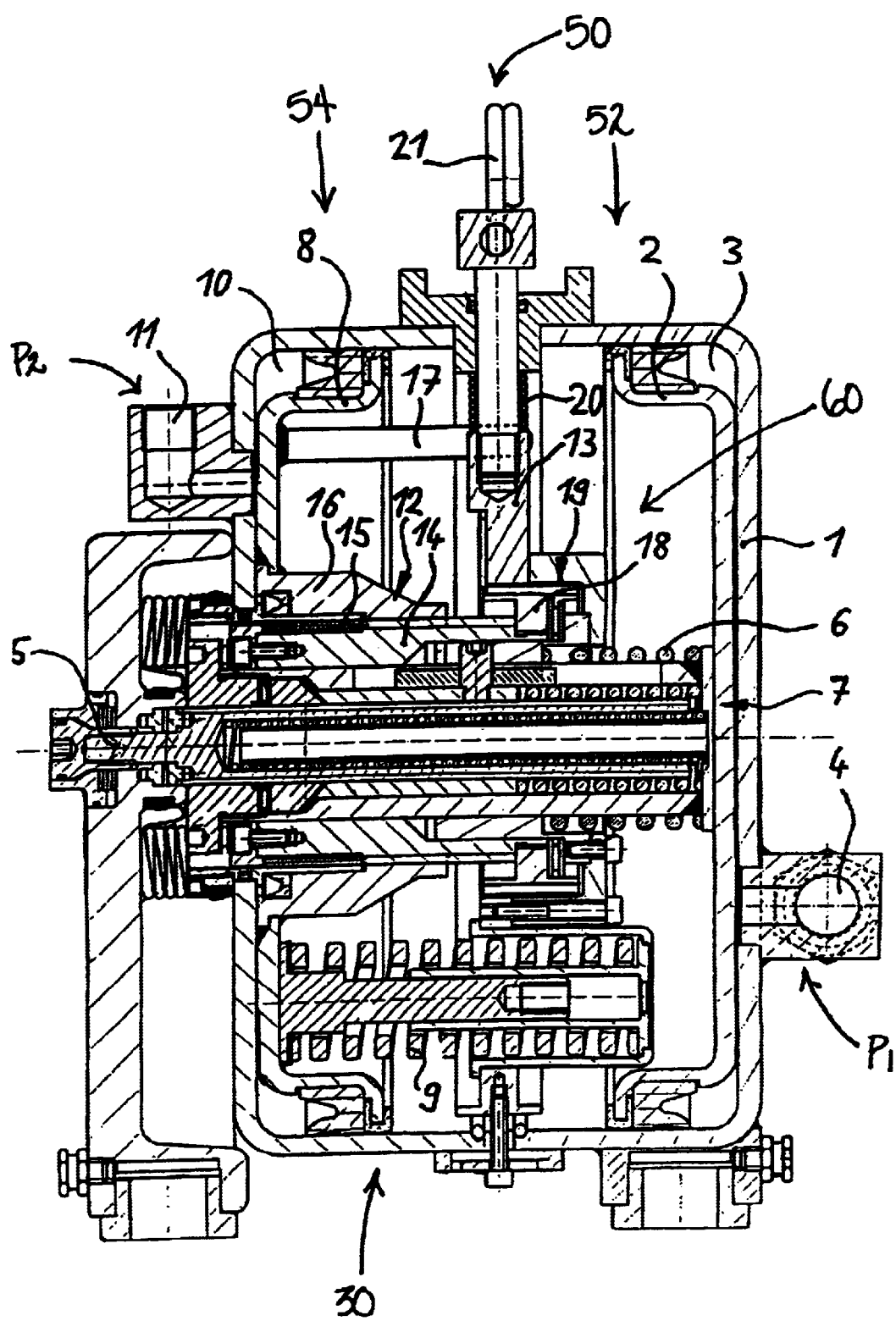
FIG. 1 is a longitudinal sectional view of a spring brake cylinder having an emergency release device according to the present invention.

A spring brake cylinder 50, as shown in FIG. 1, comprises a two-piece, essentially cylindrical housing 1. Within a first half 52, housing 1 has an axially displaceable service brake piston 2. By way of an assigned service brake pressure chamber 3, the piston 2 can be acted upon by an apply pressure medium $P_1$ through a connection 4 that is arranged at or on the housing 1. A braking force is transmitted to a brake linkage (not shown) of a rail vehicle (not shown) by way of an output side piston rod 5 which extends out of the housing 1 in a sealed manner and is fastened coaxially to the service brake piston 2. A restoring of the service brake piston 2 takes place in a bled condition of the service brake pressure chamber 3 essentially by the force of a restoring spring 6 acting between the housing 1 and the service brake piston 2. Furthermore, the piston rod 5 is equipped with a mechanical adjusting device 7 for compensating for a wear tolerance resulting from the wear of brake linings (not shown).

In addition to the above-described service brake piston 2, a spring brake 30 is integrated in the spring brake cylinder 50. Cylinder 50 also has an axially movable spring piston 8 that is arranged within a second half 54 of the housing 1. On one side, the spring piston 8 can be moved by one or more accumulator-type springs 9. The springs 9 are arranged at such radial distances and at mutually such other distances with respect to the spring piston 8 and also interact with parts of the housing 1 in order to automatically operate the spring brake 30 in the event of a pressure drop in a release pressure medium $P_2$. On the other side of the spring piston 8, a spring pressure chamber 10 is situated. The spring pressure chamber 10 has an assigned connection 11 for supplying the release pressure medium $P_2$. The chamber 10 can be acted upon by the release pressure medium $P_2$ for releasing the spring brake 30, thus restoring the spring piston 8 against the force exercised by the accumulator-type springs 9.

In a flux or transmission of force between the spring piston 8 and the output-side piston rod 5, a not self-locking threaded screw or threaded spindle drive 12 is arranged. The screw drive 12 is locked during normal operation and can be manually unlocked by means of a latch 13 assigned to an emergency release device 60, in order to be able to release the spring brake 30 in the absence of any pressure medium $P_2$.

A part of the threaded screw drive 12 is rotatable relative to the housing 1. That part may be constructed as a screw 14.

The screw 14 may be axially displaceable together with the piston rod 5 and may be disposed to be rotatable about the piston rod 5. The screw 14 can be displaced by way of an outer-radial plastic bushing 15 and rotatably guided in the housing 1.

A nut 16, may be a non-rotatable part of the threaded screw drive 12, and may be arranged stationarily with respect to the spring piston 8, and may interact with the screw 14. A rotating movement of the spring piston 8 with the nut 16 may be prevented, by a torque lock 17, which may interact with parts of the housing 1 in the manner of a mechanical stop.

For locking and unlocking the threaded screw drive 12, a gear wheel element 18 may be provided which may be stationarily but demountably fastened to the screw 14. The gear wheel element 18 has an outer-radial sliding surface 19 with a detent flank 22 (see FIGS. 2A–3B) for the latch 13, which interacts with the wheel element 18 and forms part of or all of the emergency release device 60. Between the latch 13 and the housing 1, a spring 20 may be arranged which may be constructed in the manner of a compression or tension spring in order to hold the latch 13 in a continuous contact on the sliding surface 19 of the gear wheel element 18. By way of an exterior grip 21, the latch 13 can be manually lifted off the sliding surface 19 against the force of the spring 20.

As shown in FIG. 1, the spring brake cylinder 50 is in an emergency-released condition. In this case, the spring brake 30 was released without any pressure medium $P_2$. That was done by pulling on the latch 13 using grip 21, which discontinues the form-locking engagement on the gear wheel element 18 and unlocks the threaded screw drive 12. The screw 14 is then freely rotatable. Thus, as a result of restoring forces, which, among other things, may originate from return spring 6, an axial moving-in (to the right in FIG. 1) movement of the piston rod 5 connected with the screw 14 occurs, enabling a releasing of the spring brake 30. The pitch of the threaded screw drive 12 is dimensioned such that the screw 14, with the gear wheel element 18, carries out less than an entire rotation along its maximal axial adjusting stroke.

As shown in FIG. 2a, the form-locking engagement of the latch 13 on the gear wheel element 18 takes place on a single detent flank 22 which may be constructed to be radially or essentially radially aligned or oriented thereon, so that the threaded screw drive 12 is locked. All or part of a circumferential surface of the gear wheel element 18 may be constructed as a uniform or non-uniformed curved path 19. In the locked condition shown in FIG. 2a, the gear wheel element 18 is in an axial end position in which a form-locking interaction with the latch 13 is still ensured. In this locked condition, a normal braking operation can take place, during which operation an axial displacement occurs (see FIG. 2b) between the stationary latch 13 and the axially movable gear wheel element 18 during a stroke movement of the piston rod 5 (see FIG. 1).

In an emergency-released condition, as shown in FIG. 3a, the form-locking engagement is discontinued between the latch 13 and the gear wheel element 18. The threaded screw drive 12 (see FIG. 1) is unlocked and the latch 13 can slide freely along the curved path 19. After the unlocking, an axial relative movement takes place between the latch 13 and the gear wheel element 18, originating from an end position, as shown in FIG. 3b, into the position shown in FIG. 2b. That occurs because of the axial moving-in movement of the piston rod 5 together with the screw 14. When pressure medium $P_2$ is available again, a release stroke of the spring piston 8 is automatically carried out while the accumulator-type springs 9 are compressed. In that case, a rotating back (to the right on FIG. 1) of the unlocked screw 14 with the gear wheel element 18 fastened or connected thereon takes place until the latch 13 arrives again in a form-locking engagement with the detent flank 22. Thus, the locked condition of the threaded screw drive 12 is reestablished. A normal braking operation will now be possible again.

The present invention is not limited to the above-described preferred embodiment. On the contrary, modifications thereof are conceivable. For example the present invention is not limited to an embodiment with a rotatable screw and a nut which is non-rotatable with respect thereto. A use is also conceivable in the case of a reverse principle of a rotatable nut with respect to a non-rotatable screw.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A spring brake cylinder having an emergency release device, particularly for rail vehicles, comprising:

a housing;

a spring piston which can be moved axially within the housing by one of at least one accumulator-type spring for operating a spring brake in the event of a release pressure medium drop and a spring pressure chamber for releasing the spring brake when the chamber is acted upon by a release pressure medium;

a normally locked, not self-locking threaded screw drive arranged in a transmission of force between the spring piston and an output-side piston rod;

an outer-radial sliding surface, of the emergency release device, having a detent flank, the outer-radial sliding surface being an element of a rotatable part of the threaded screw drive that rotates with respect to the housing, and the threaded screw drive having a pitch dimensioned such that the rotatable part carries out less than a complete rotation along its maximal axial adjusting stroke, and the detent flank being configured for locking the emergency release device; and a latch, of the emergency release device, held in contact with the sliding surface, for interacting with the detent flank to lock the emergency release device, and for releasing the spring brake in the absence of the release pressure medium by manually unlocking the not self-locking screw drive and thereby permitting axial movement of the spring piston.

2. The spring brake cylinder according to claim 1, wherein the sliding surface is constructed as a curved path.

3. The spring brake cylinder according to claim 2, wherein the detent flank is an essentially radially aligned surface.

4. The spring brake cylinder according to claim 2, wherein a switching condition of the emergency release device is indicated by a stroke difference that occurs in an interaction of the latch and the curved-path-shaped sliding surface.

5. The spring brake cylinder according to claim 1, wherein the detent flank is shaped in one of a groove-type manner as an indentation and in a tooth-type manner as an elevation.

6. The spring brake cylinder according to claim 1, wherein the rotatable part of the threaded screw drive is constructed as a screw which is axially displaceable together with a piston rod and which screw is disposed to be rotatable about the piston rod, and which screw interacts with a nut, as a non-rotatable part of the threaded screw drive, and which nut is stationarily arranged with respect to the spring piston.

7. The spring brake cylinder according to claim 6, wherein a gear wheel element is stationarily but demountably fastened to the screw, and which gear wheel element includes the outer-radial sliding surface with the detent flank, all interacting to form a part of the emergency release device.

8. The spring brake cylinder according to claim 6 or 7, wherein the screw is displaced by an outer-radial plastic bushing and is rotatably guided in the housing.

9. The spring brake cylinder according to claim 1, wherein the rotatable part of the threaded screw drive is constructed as a nut which nut is axially displaceable together with the spring piston and the nut is coaxially rotatably disposed on the spring piston, and interacts with a screw, as a non-rotatable part of the threaded screw drive, and which screw is stationarily arranged with respect to the piston rod.

10. The spring brake cylinder according to claim 1, wherein a spring is arranged between the latch and the housing and is constructed as one of a compression and tension spring holding the latch in continuous contact on the sliding surface.

11. The spring brake cylinder according to claim 1, wherein the latch is remote-controlled by an auxiliary device.

* * * * *